Patented Apr. 30, 1940

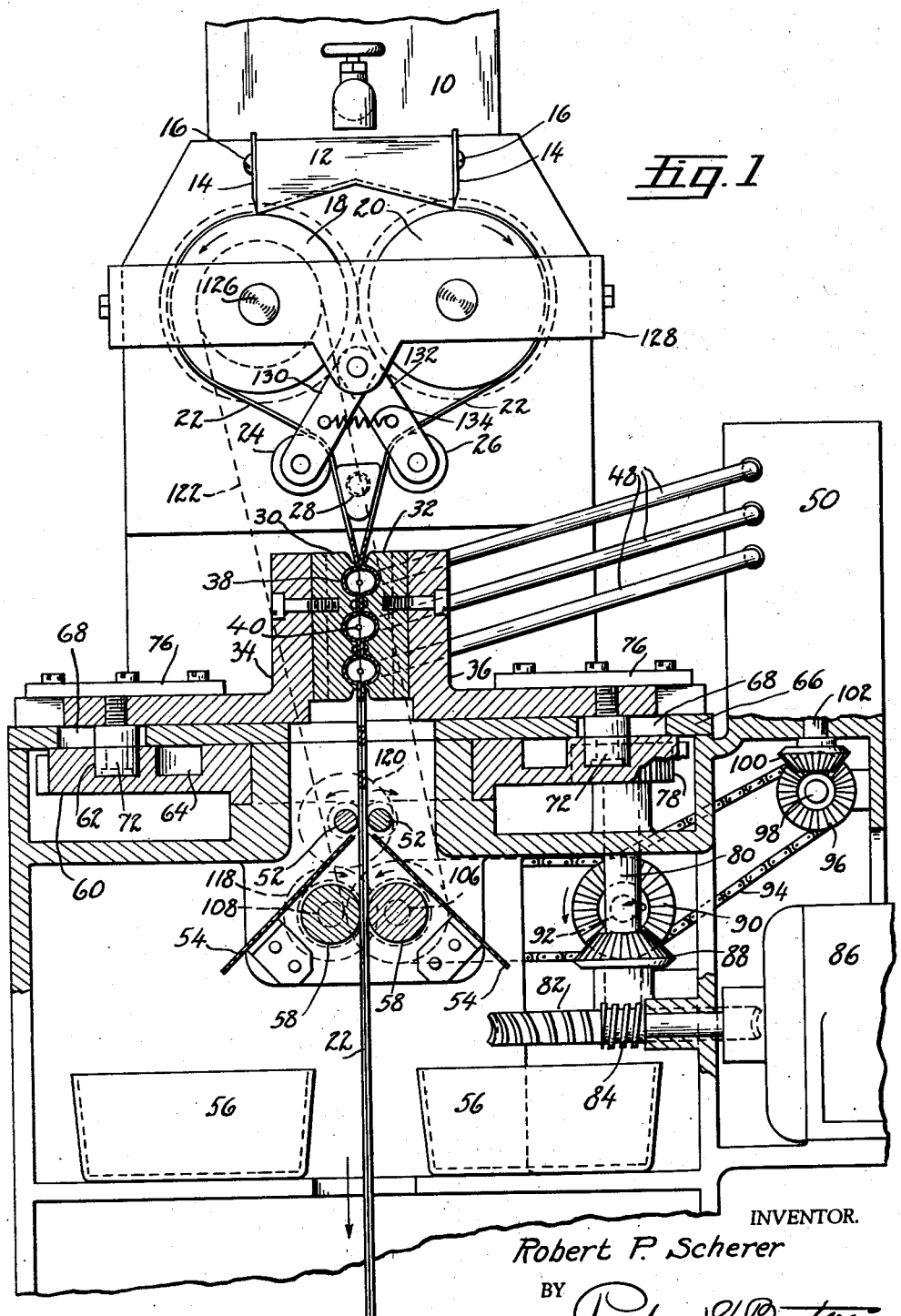

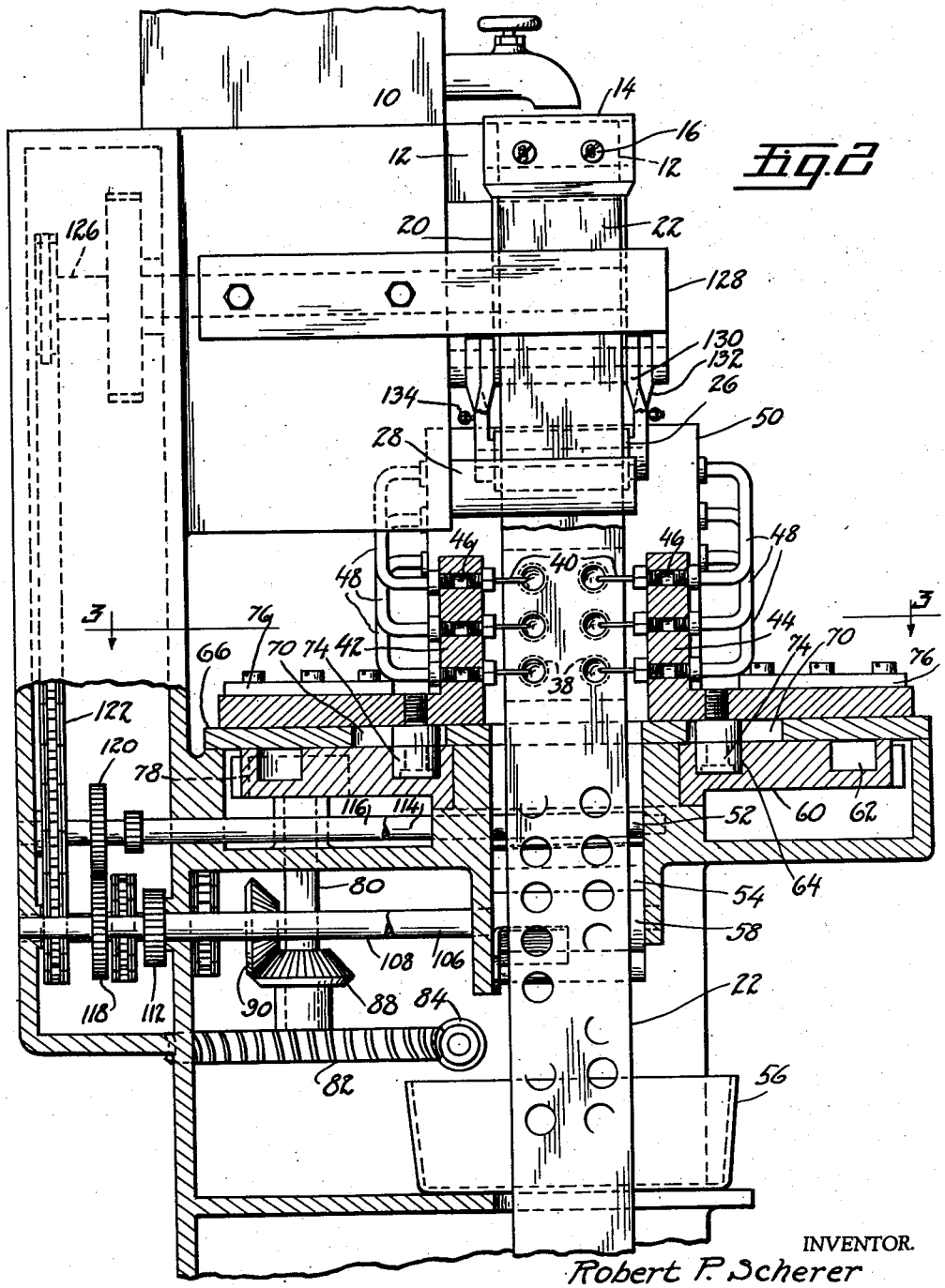

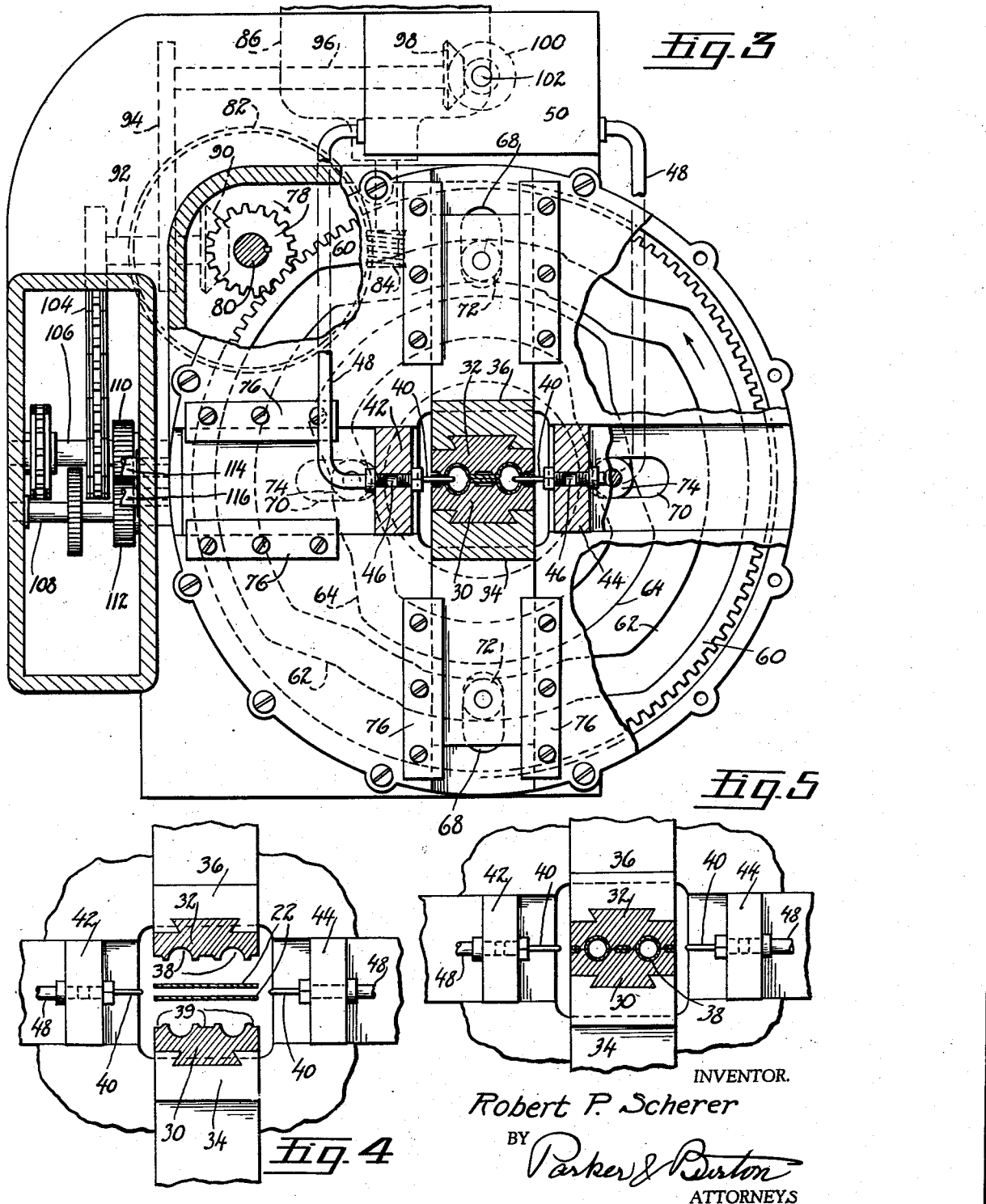

2,199,210

UNITED STATES PATENT OFFICE 2,199,210

METHOD AND APPARATUS FOR MAKING CAPSULES BY NEEDLE INJECTION

Robert P. Scherer, Detroit, Mich.

Application October 28, 1935, Serial No. 47,094

8 Claims. (Cl. 18—19)

My invention relates to improvements in capsule forming and filling mechanism and to improvements in the method of forming and filling capsules.

An object of this invention is to provide an improved method and apparatus for shaping and filling capsules formed from sheets of plastic materials. In accomplishing this purpose, the capsules are simultaneously formed and filled by an apparatus including, in its structural embodiment, a pair of opposed plane faced die stamping members between which sheets of plastic material are fed. Simultaneously as the die members approach one another to shape the plastic material, dosages intended for the capsules are introduced in controlled quantities between the sheets by a novel ejection device. This device, as illustrated in the embodiment described herein, may comprise a hollow needle or nozzle shiftable into and out of the space between the plastic sheets. The operation of the ejection device and the die members are synchronized by novel mechanism thereby insuring accuracy and high speed operation.

Other objects, advantages and meritorious features will more fully appear from the following description, appended claims, and accompanying drawings, wherein:

Fig. 1 is a front view partly cross sectional of the apparatus showing the manner of feeding the strips of plastic material between the dies, Fig. 2 is a side view partly in cross section illustrating the manner of ejecting capsule filling material between the strips of plastic material, Fig. 3 is a top view partly cross sectional, illustrating the die and injection assembly and their mode of operation, Fig. 4 is a detail view showing the plastic sheets prior to deformation between the dies, and Fig. 5 is a detail view showing the deformation of the plastic sheets between the dies.

The apparatus consists essentially of a pair of opposed plane faced die members, and offset with respect thereto one or more nozzles capable of shifting into and out of the operating zone between the die members as they approach one another. The nozzles discharge capsule filling material between two sheets or strips of plastic material fed between the die members. The pressure of the discharged material deforms the plastic sheets into cavities or pockets formed in the working faces of the opposed die members as these compress the sheets together. Prior to complete compression of the die members, the nozzles or hollow needles are withdrawn from between the plastic sheets whereby the continued compression of the sheets completely seals the apertures.

In the construction shown there is a vat 10 wherein plastic material such as molten gelatin may be maintained at the desired temperature by heating means not here illustrated. The gelatin is delivered therefrom in a controlled stream into a pan 12 having a deformed bottom which causes the gelatin to divide and flow to opposite sides of the pan. The side walls 14 of this pan are vertically adjustable by means of a screw slidably fitted in a slot as generally indicated at 16 in Fig. 2. The lower edge of the walls 14 are knife edged and allow the gelatin to pass thereunder in thin regulated films and onto the peripheries of two cooling drums 18 and 20. The drums are driven by mechanism to be hereinafter described.

The solidified strips or bands 22 of gelatinous material are advanced along converging paths assisted by the yieldingly mounted rollers 24 and 26. An electric heating element 28 having a heating coil therein is arranged between the strips of plastic material just prior to complete convergence in order to maintain the strips in a plastic condition.

The converging strips or sheets of plastic material are advanced side by side between a pair of opposed plane faced die members 30 and 32 secured in any satisfactory manner to frame supports 34 and 36 respectively each mounted for reciprocating movement toward and away from one another. The die members are counterparts and one operates upon the outer surface of one strip and the other upon the outer surface of the other strip. The working faces of these dies are shaped with corresponding cavities or pockets 38 as is most clearly shown in Fig. 4. Slight recesses such as that indicated at 39 are provided for allowing portions of the plastic strips to flow thereinto when the strips are compressed and deformed by said die members. As illustrated, each die member is provided with three pairs of cavities 38 so that the apparatus is capable of forming six capsules at each stamping operation. It is obvious that the number or shapes of cavities can be varied if desired.

Alongside of the die members and in substantially the same plane as the strips or sheets of plastic material are a plurality of injection devices 40 in the form of nozzles or hollowed needles. In Fig. 2, six of these devices are shown corresponding in number and position to the cavities on the working faces of the die members. These needles are threaded in or otherwise secured to L-shaped supports or members 42 and 44 capable like the die members of reciprocating movement to and from the plastic strips. The supports 42 and 44 are apertured at 46 to conduct capsule filling material therethrough from flexible conduits 48 to the hollowed needles 40. The flexible conduits 48 are connected to a pump mechanism or other pressure device generally indicated at 50 (Figs. 1 and 2).

After passing through the stamping mechanism the strips or bands 22 of gelatinous material, with the filled capsule bodies formed therein, are fed through rollers 52 which are driven in a direction counter to the advance of the strips. The rollers are spaced slightly from the surface of the strips so as to contact the capsule bodies only as the strips pass therebetween. This causes any capsule bodies retained in the strips to be dislodged therefrom and fall into slanting delivery chutes 54 on either side of the strip. From thence the capsules are dropped into containers 56. The unused portion of the strips pass between feed rollers 58 which assist in the advance of the strips through the stamping and filling mechanism. The unused portions of the strips may be collected in any desirable way and reused if desired.

With more particular reference to Figs. 1, 2 and 3, the operation of the die members 30 and 32 and the injection devices 40 are synchronized by a rotating disc or gear wheel 60 having cam guides or grooves 62 and 64 in its upper face. Over the top of the gear wheel is placed a fixed plate 66 having four diametrically opposite slots two of which are indicated at 68 superimposing the cam groove 62 and two at 70 superimposing the cam groove 64. Extending through each of these slots and bearing in the grooves 62 and 64 are cam rollers 72 and 74 respectively. Each cam roller 72 is bolted or otherwise secured to one of either of the die supports 34 and 36 as indicated in Fig. 1. Each cam roller 74 is secured to one of either of the supports 42 or 44 for the injection devices as indicated in Fig. 2. The cam grooves 62 and 64 are irregularly designed but each bears a relation to the other so as to produce synchronized reciprocal movement of the dies and injectors when the gear wheel 60 is rotated. Guide members 76 overlap the supports for the dies and injectors and prevent the same from vertical misalignment. The slots 68 and 70 insure correct alignment of the opposed injectors and dies as they advance toward one another.

The drive mechanism for the gear wheel 60 consists of the pinion 78 in engagement therewith and fixed to a vertical shaft 80 which is provided with a gear 82 at its lower extremity coupled through a worm gear drive 84 with the electric motor 86. Drive mechanism for the pump 50 is shown in Figs. 1 and 3 wherein a beveled gear 88 splined to shaft 80 engages a beveled gear 90 secured to shaft 92. A chain drive 94 connects this shaft with shaft 96 upon which is secured a beveled gear 98 engaged with beveled gear 100 on the lower extremity of the pump shaft 102.

The drive mechanism for the various rollers 18, 20, 52 and 58 which assist the advance of the gelatinous strip is as follows: A chain drive 104 couples shaft 92 with shaft 106. Parallel with shaft 106 is a second shaft 108 and these two are rotatively coupled together by engaged gears 110 and 112. Shafts 106 and 108 are provided at one end with the rollers 58—58. Above these shafts is a second pair of shafts 114 and 116 which are rotatively coupled together in the same manner as the pair of shafts therebelow. The two pair of shafts are rotatively coupled together by the gears 118 and 120 each secured to shafts 108 and 116 respectively. This gear relation causes the two pairs of shafts to rotate in reverse direction as indicated by the arrows around rollers 52 and 58 in Fig. 1. As indicated in Fig. 2 the rollers 52 are in reality portions of the shafts 114 and 116.

The drive for the large feed rollers or drums 18 and 20 consists of a chain 122 coupling shaft 106 with the shaft 126 to which drum 18 is secured. The chain drive is indicated in dotted lines 122 in Fig. 1. Drum 20 is geared in any obvious manner to its companion drum 18.

The bracket 128 extends around the drums 18 and 20 and is provided with a depending portion to which the links 130 and 132 are pivoted. These links are resiliently urged toward one another by spring 134 and the rollers 24 and 26 secured to their links yieldingly draw the strip of gelatinous material together.

In the operation of the apparatus, the strips are passed vertically downward through an aperture in the gear 60 and brought into close juxtaposition as they pass between the die stamping mechanism 30 and 32. This is shown in Fig. 4, which indicates the position of the apparatus prior to the filling and stamping of the capsules. Upon rotation of the gear wheel 60 in the direction of the arrow (Fig. 3) the path of the cam grooves 62 causes the die members 30 and 32 to advance toward one another until the gelatinous strips are contacting one another. At the same time, the path of the cam groove 64 causes the injection nozzles to advance into the space between the strips as the latter are pressed into engagement by the die members. The position will be that illustrated in Fig. 3. The forced discharge from the needles of capsule filling material, such as a fluid medicament, will distort the plastic strips into the cavities of the die members thereby forming the shape of the capsule body.

Upon further rotation of the wheel 60, the path of the cam groove 64 causes the support carrying the needles to withdraw the needles from the space between the strips. Simultaneously with their withdrawal, the die members are caused to be forced by the path of their respective cam groove against one another sealing the capsule halves together and shearing the formed filled capsules from the strips. The elevated portions of the die members surrounding the cavities 38 shear the capsule bodies from the strips, and the recesses 39 permit the displaced portions of the strips to flow thereinto. The position of the apparatus at this step is shown in Fig. 5. The open position of the dies is shown in Fig. 4. This procedure follows continuously as the strips are fed through the machine.

I claim:

1. Apparatus for forming and filling capsules comprising, in combination, a pair of opposed movable die members having complementary cavities in their working faces, means for feeding a pair of strips of plastic material in spaced face to face relationship between the working faces of said die members, means for moving said die members toward and away from one another to compress the strips of plastic material between the working faces thereof, means for injecting capsule filling material between said strips including a movable nozzle for each complementary pair of cavities, means for moving said nozzles in a direction to enter the space between the strips of plastic material from the side thereof and in the reverse direction to withdraw the nozzles from said space, and common means for operating said die member moving means and said nozzle and timing the movements of the die members and the nozzles so that the latter are withdrawn from the space between the strips of plastic material before complete compression of these strips by the working faces of the die members.

2. In capsule forming apparatus, a rotatable member having a track on one side thereof extending around its axis of rotation at varying distances therefrom, opposed die members having working faces provided with opposed cavities shaped to form capsule bodies in plastic material fed therebetween, means for feeding two corresponding strips of capsule forming material into face-to-face relationship between said die members, means mounting said die members for reciprocal movement toward and away from one another, means for rotating said rotatable member, means on each of said die members engaging with said track for imparting reciprocal movement to its respective die member in accordance with the position of the track from the axis of rotation of said member, said track being shaped to cause the die members to reciprocate toward and away from one another simultaneously to compress said strips together encircling said cavities, and a needle injection device supported for reciprocable movement into and out of position between corresponding areas of said strips overlying said cavities.

3. In capsule forming and filling apparatus, a rotatable member having a track on one side thereof extending around its axis of rotation at varying distances therefrom, complementary die members supported for advancement toward and withdrawal away from one another and coupled with said rotatable member for such advancement and withdrawal, means for feeding two strips of capsule forming material into opposed relationship between said die members, a needle injection device operable to discharge dosages of capsule filling material between said strips between said die members, means mounting said injection device for reciprocal movement, means for rotating said rotatable member, and means on said injection device engaging with said track for imparting reciprocal movement to the injection device in accordance with the position of the track from the axis of rotation of said member to advance said needle injection device into position between said strips between said die members and to withdraw the same therefrom before the die members have reached the limit of their movement toward each other.

4. Apparatus for forming and filling capsules comprising, in combination, a pair of opposed movable die members each having a cavity in its working face complementary to that in the working face of the other die member, means for feeding a pair of strips of plastic material in face to face relationship between the working faces of said die members, an injection nozzle for supplying capsule filling material, means mounting said nozzle for movement between said strips from a point where the discharge end of the nozzle lies without the area defined by said cavities to a point where the discharge end of the nozzle lies within said area, means mounting said die members for movement toward and away from one another, and means for moving said injection nozzle and said die members in timed relationship so that the discharge end of the nozzle enters the area defined by said cavities and is retracted therefrom before the strips of plastic material are completely compressed between said die members.

5. In capsule forming and filling apparatus a rotatable member having a central aperture, means coupled therewith to rotate said member, a pair of opposed die elements having complementary cavities in their opposed working faces, said die elements positioned in line with the aperture through said rotatable member, means for feeding two strips of capsule forming material in face-to-face relationship between the working faces of said die members and through apertures in said rotatable member, a shiftably supported injection device operable to feed dosages of capsule feeding material between opposed areas of said two sheets of capsule forming material, said rotatable member provided with cam grooves in one of its surfaces about said aperture, cam elements engaged in said grooves and coupled with said dies and with said injection device, said cam elements operable upon rotation of said grooved rotatable member to reciprocate said dies toward and away from one another and to shift said injection device into and out of the space between said sheets of capsule forming material in accordance with the contour of said cam grooves as they rotated with said member.

6. In capsule forming and filling apparatus a rotatable power driven member provided with cam trackways, a pair of relatively movably supported complementary die members coupled through one of said trackways with said rotatable member to be advanced toward and withdrawn from each other upon rotation of said rotatable member, means for feeding a pair of capsule forming bands between said die members to be acted upon thereby, a movably supported needle injection device coupled through one of said cam track ways with the rotatable member for advancement and withdrawal of the needle injection device between said die members and between the capsule forming bands passing between the die members upon rotation of said rotatable member, said needle injection device adapted to be withdrawn from between said bands before the die members have reached their limit of advancement toward each other, and means for feeding capsule filling material through said needle injection device.

7. That method of forming and filling capsules comprising initially compressing a pair of opposed strips of plastic capsule forming material into contact along a line completely enclosing the area circumscribed thereby, injecting determined dosages of substantially non-compressible capsule filling material between corresponding circumscribed areas of said strips following the initial compression thereof under pressure sufficient to cause said strips to be deformed into cavities for receiving said material, and continuing said compression following the injection of the filling material and maintaining the space between said strips into which the capsule filling material is injected sealed from the atmosphere during the filling of said space and during the compression following said filling.

8. That method of forming and filling capsules comprising initially compressing a pair of opposed strips of plastic capsule forming material into overall surface contact enclosing corresponding circumscribed areas of said strips, injecting determined dosages of substantially non-compressible capsule filling material between said opposed circumscribed areas of said strips following their initial compression under sufficient pressure to deform said circumscribed areas of the strips to produce complementary filled cavities therein, and continuing the compression of said strips sealing the same together around said filled cavities forming filled capsules and severing the filled capsules from the strips and maintaining the space between said strips into which the capsule filling material is injected sealed from the atmosphere during the filling of said space and during the compression following said filling.

ROBERT P. SCHERER.